(12) United States Patent
Mason

(10) Patent No.: US 6,341,787 B1
(45) Date of Patent: Jan. 29, 2002

(54) ROUGH TERRAIN CARRIER

(76) Inventor: Gordon Mason, 1609 Campton Rd., Eureka, CA (US) 95503

( * ) Notice: Subject to any disclaimer, the term of this patent is extended or adjusted under 35 U.S.C. 154(b) by 0 days.

(21) Appl. No.: 09/494,482

(22) Filed: Jan. 31, 2000

(51) Int. Cl.[7] .................................................. B62B 1/00
(52) U.S. Cl. ..................................... 280/47.26; 280/652
(58) Field of Search ................................. 280/651, 652, 280/645, 646, 655, 655.1, 47.3, 47.131, 47.23, 47.24, 47.25, 47.26, 39, 47.17, 40, 79.2, 63, 47.21; 182/20

(56) References Cited

U.S. PATENT DOCUMENTS

| | | | | |
|---|---|---|---|---|
| 1,572,531 A | * | 2/1926 | Henkel | 280/652 |
| 2,979,338 A | * | 4/1961 | Dwyer | 280/47.3 |
| 2,992,834 A | * | 7/1961 | Tidwell et al. | 280/47.131 |
| 3,222,100 A | * | 12/1965 | Lindzy | 280/652 |
| 3,706,461 A | * | 12/1972 | Devol | 280/47.26 |
| 3,907,323 A | * | 9/1975 | Knapp et al. | 280/47.3 |
| 4,063,744 A | * | 12/1977 | Fraser | 280/655 |
| 4,252,334 A | * | 2/1981 | Filkins | 280/47.26 |
| 4,349,210 A | * | 9/1982 | Rutt | 280/47.26 X |
| 4,789,180 A | * | 12/1988 | Bell | 280/652 |
| 5,330,212 A | * | 7/1994 | Gardner | 280/40 |
| 5,433,291 A | * | 7/1995 | Shoestock, Sr. | 182/20 |
| 5,496,143 A | * | 3/1996 | Breyer | |
| 5,620,193 A | * | 4/1997 | Dschaak | 280/47.131 |
| 5,645,292 A | * | 7/1997 | McWilliams et al. | 280/47.26 X |
| 5,839,740 A | * | 11/1998 | Seeger | |
| 5,887,879 A | * | 3/1999 | Chumley | 280/40 |

FOREIGN PATENT DOCUMENTS

| | | | |
|---|---|---|---|
| DE | 3044595 | * | 6/1982 |
| IT | 501362 | * | 11/1954 |

* cited by examiner

Primary Examiner—Brian L. Johnson
Assistant Examiner—Bryan Fischmann
(74) Attorney, Agent, or Firm—Mark C. Jacobs

(57) ABSTRACT

A wheeled carrier for use in rough terrain for carrying hunting kills, injured persons or supplies, which carrier has two mirror image canted tired wheels each mounted on a separate axle disposed within its fork, which in turn is attached to a frame below a bed. The wheels are preferably bicycle spoked wheels with balloon tires thereon. The frame is formed of tubular members which are bent into a specific configuration and the bed is preferably formed of flexible wire mesh connected to the frame members.

11 Claims, 3 Drawing Sheets

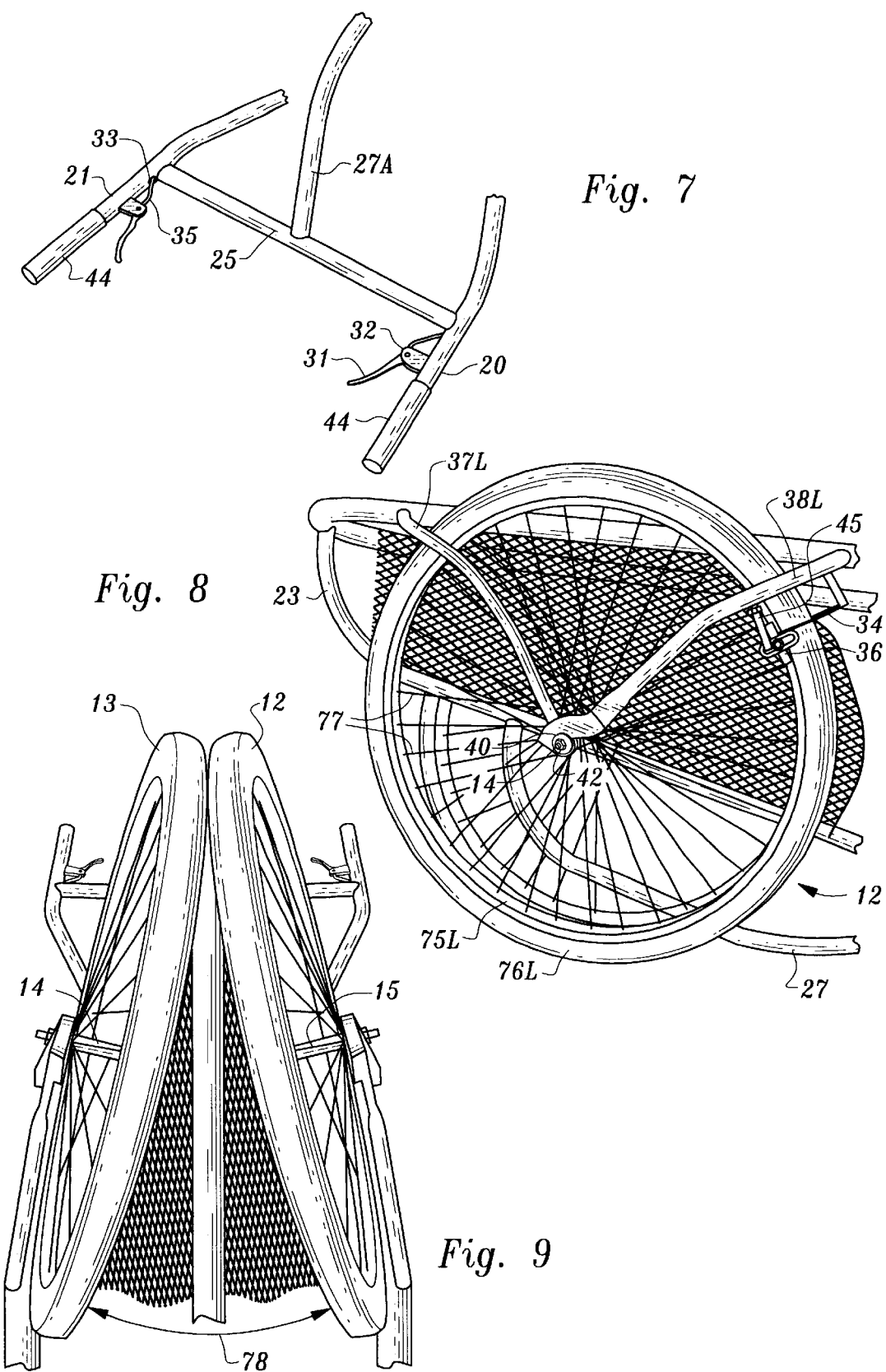

ROUGH TERRAIN CARRIER

FIELD OF THE INVENTION

This invention pertains to an apparatus for carrying hunting kills, injured persons, camping gear and other items in forests and other rough terrain areas.

BACKGROUND OF THE INVENTION

Hunters and trappers have had a need for a wheeled carrier for bringing their kills back from the forest. So too have fishermen who visit hidden mountain streams. But the wheelbarrows of today are not designed to carry large objects, nor are they. constructed for use on rough terrain, i.e., to go over logs, into ruts in the trail, and over stones. In addition, the carriers available in the marketplace, such as a builder's wheelbarrow are heavy and not suitable to be carried along with one's deer rifle, or fishing rod and tackle box.

Thus there has been an unfilled need for a lightweight portable carrier suitable for movement in rough terrain, while being readily portable.

It is an object therefore of this invention to provide a wheeled carrier that is suitable for use in rough terrain.

It is another object to provide a lightweight carrier that is designed to carry a deer, or several small animals such as rabbits, an injured person and/or other gear through the backwoods and on level ground as well.

It is yet another object to provide a portable wheeled carrier that can move through underbrush.

Other objects of the invention will in part be obvious and will in part appear hereinafter.

The invention accordingly comprises the device possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

BRIEF DESCRIPTION OF THE FIGURES

FIG. 7 is a close-up of a portion of this apparatus.

FIG. 8 is a close-up view of the side of this apparatus.

FIG. 9 is a bottom close-up view of a portion of this apparatus.

SUMMARY OF THE INVENTION

A wheeled carrier having two mirror image canted tired wheels each mounted on a separate axle to a frame on opposite sides thereof, below a bed defined by a frame of tubular members. The wheels are preferably bicycle spoked wheels with balloon tires thereon. The frame is formed of the tubular members in a specific configuration and the bed is formed of flexible mesh.

DESCRIPTION OF THE PREFERRED EMBODIMENT

Figure 1:
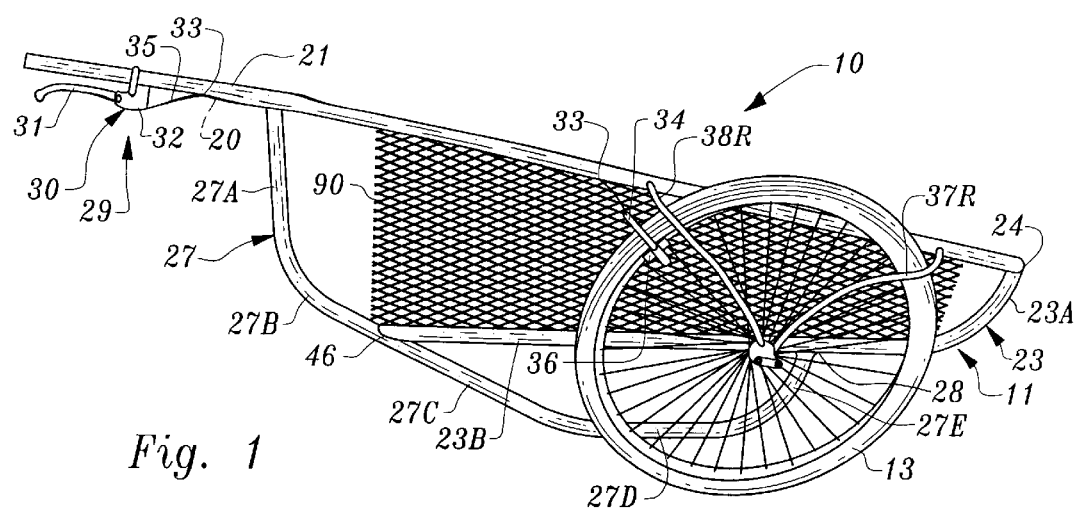
FIG. 1 is a right side elevational view of the apparatus of this invention.

The reader's attention is directed to FIG. 1. In this figure, the invention 10 is seen to be formed of a main body or frame 11 to which is attached left axle 14 and right axle 15, the former carrying left wheel 12 and the latter carrying right wheel 13. The frame or body 11 comprises a series of members which in most instances may be rods or tubes, but in those instances where brake cables pass through them, only tubes will work. Of course, rods could be employed there also with the cables running along the outside of the rod, and held in place by cable ties or other recognized means. For ease and convenience, the word rod only will be employed.

Thus the members include a left upper rod 20 having four sections 20A, B, C, and D; as well as the right upper rod 21 also having four sections; namely, 21 A., B, C, and D.

Figure 2:
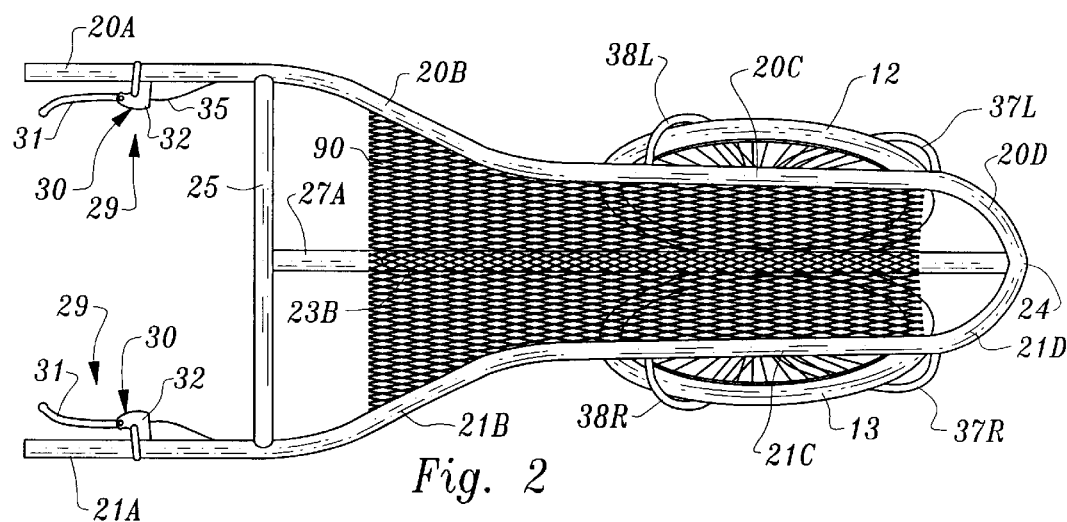
FIG. 2 is a top plan view of the carrier of this invention.

Reference is now made to FIG. 2 wherein the four sections of rods 20 and 21 can be seen. Thus section 20A begins at the rear of the apparatus, and is disposed spaced from and parallel to long rod 21A. The next section is 20B and 21B respectively. These are opposed sections that commence at the distal terminal of 20A and 21A and are disposed slightly forwardly and then inwardly until their point of termination at the commencement of sections 20C and 21C respectively. Sections 21C and 20C are parallel to each other but are spaced closer together than sections 20A and 21A. These terminate at their respective distal ends in arcuate sections 20D and 21D to form a nose 24, which constitutes the frontal edge or nose of the apparatus. Returning momentarily to the first end of rods 20 and 21, in FIG. 7, optional rubber or plastic handgrips 44 are seen to be disposed upon the termini of rods 20 and 21 for more assured griping, especially in wet and/or cold weather.

Nose rod 23 extends arcuately downward and rearward as section 23A from nose 24, and then rearwardly horizontally at the distal terminus thereof as section 23B. Nose rod 23 terminates at its rearward extremity at a point along bottom rod 27 at point 46 which is also the commencement point of section 27C of bottom rod 27.

A cross member 25 connects the distal end of frame member 20A to the distal end of 21A as is best seen in FIG. 2. A five sectioned bottom rod 27 connects the midpoint of the cross member 25 to a point 28 about ¼ along the length of section 23B as measured from its point of connection to section 23A. See FIG. 8 as well. Rod 27 commences at its proximal end, as section 27A at the midpoint of the junction of the crossbar 25 and depends downwardly therefrom. At the distal end thereof, section 27B commences and is configured as an arcuate member that forms an approximately 45 degree turn forwardly. From its distal end, at point 46 noted above, commences section 27C which extends downwardly and forwardly. Section 27D extends forwardly and generally horizontally therefrom, and at its forward or distal end commences section 27E which extends upwardly and arcuately to an attachment point as by welding to nose rod 23 along the horizontal portion of the length thereof.

Seen also in FIG. 1, is one of the two mechanical bicycle brake sets, 29 having housing portions 30, which include levers 31, cable holders 32 and cables 35. A cable 35 runs into and through rod 20 at a first bore 33, and exits at a second bore 33, for connection to the caliper brake mechanism 34, having shoes 36, said mechanism being mounted to the rear wheel form 38L, 38R, by a retainer 45. See also FIG. 7, for bore 33 . In FIG. 1 the right rear wheel fork is seen and designated 38R. The right front wheel fork is designated 37R. The left wheel forks are similar as per FIG. 2 and bear designators 37L and 38L respectively.

The wheel forks 38L and 37L of the left wheel 12 are the same as those of the right wheel 13 just described, and are seen in FIG. 8. And such need no separate discussion. The same is true of the single handbrake of the left wheel 12, Hub 40, present in FIG. 1 is best seen closeup in FIG. 8. The reader is advised that the brake cables could, if desired, also be clipped to the rods 20, 21 in a conventional manner a by the use of cable ties, as is often done in the bicycle art, prior to the connection to calipers 36.

As seen in all of the figures, the mesh bed 90 is formed of flexible expanded metal mesh, but plastic mesh may also be employed. Mesh 90 is attached to the rods 20, 21 and 23 preferably by gas brazing or welding, though it, 90, can also be anchored by drilling holes in the several rods and using self-tapping screws with suitable washers. Note that the mesh bed 90 commences at the nose 24, and extends rearwardly as far back as point 46, which is the junction of rods 23 and 27 as previously described. See FIGS. 1 and 2. Note also that the mesh shown here does not extend all the way forwardly to the nose 24,—see FIG. 6 but such is also contemplated by this invention. In this close-up figure, a tie down or cleat 50 is seen for the attachment of a rope, 51 for pulling the carrier of this invention from mud or snow, should it get bogged down.

Figure 3:
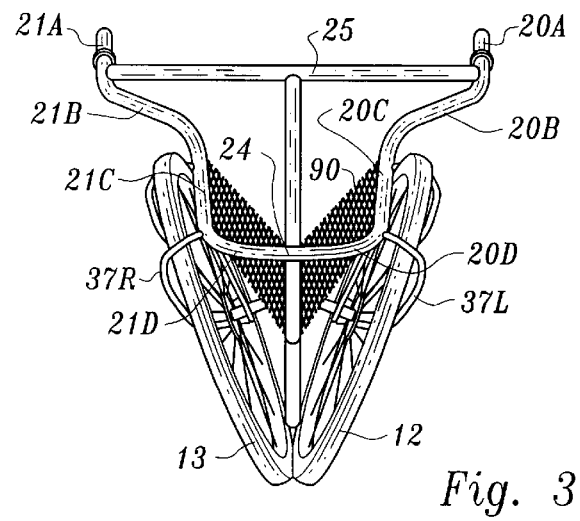
FIG. 3 is a top front perspective view.
Figure 4:
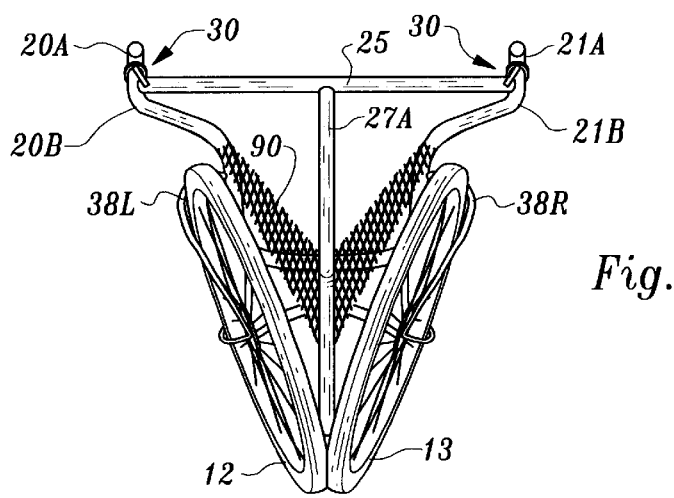
FIG. 4 is a rear elevational view.
Figure 5:
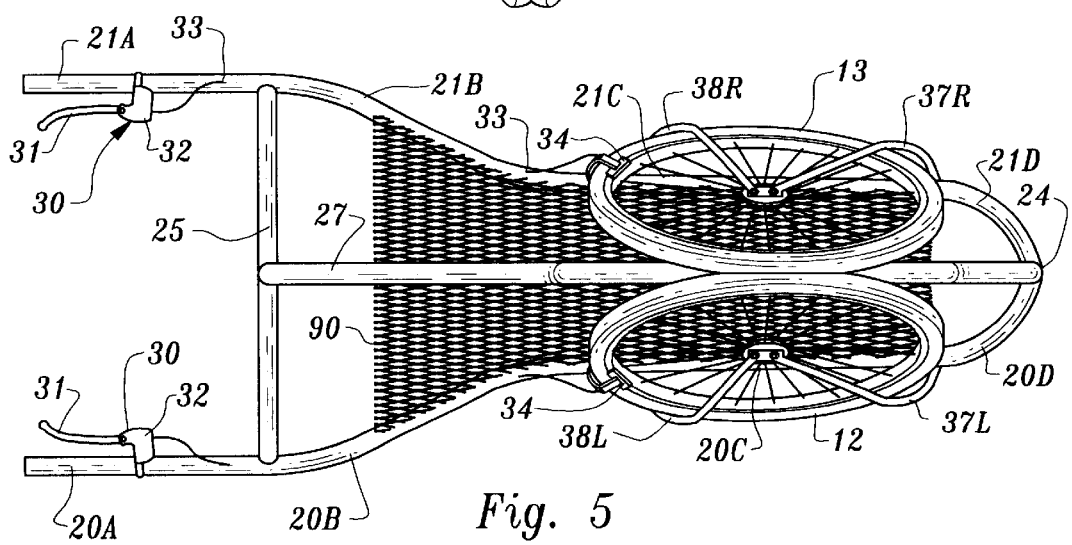
FIG. 5 is a bottom plan view.

The discussion now turns to the details of wheels 12 and 13 which as can be seen in FIG. 3 are canted inwardly from top to bottom. See also FIGS. 5 and 9. While 38 degrees is the preferred incantation, the pitch, 78, can vary from about 20 to about 45 degrees from top to bottom.

Figure 6:
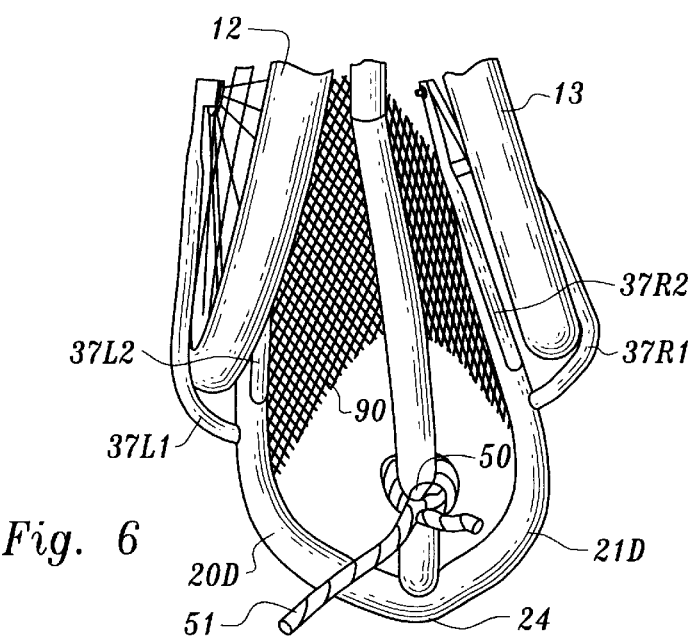
FIG. 6 is a close-up of a portion of a section of the front area of this apparatus.

In FIG. 8, the left wheel's front fork 37L and the rear fork 38L are seen spaced apart at the closed ends thereof but meeting though not joined for disposition upon the left axle 14. Axle 15, the left axle and its fork of similar configuration is seen in FIG. 9 and it too is disposed in a hub, 40. Either the front or the rear fork can be the outer or inner at the mounting on the respective axle. At first one becomes of the impression that the forks are inverted U shape members as are found on bicycles. But in fact such is not the case as can be seen form the inverted view of FIG. 6. Thus the fork 37R is made up of two components, the outer inverted L bar 37R1 and the I bar 37R2. The I bar, which is the interior bar, is attached directly as by welding to the long rod 21A, at a point spaced slightly from the junction attachment of the L-bar 37R1, as can be seen in FIG. 6. In this figure the complementary section 37L1 can be seen, though 37L2 can not. See also FIG. 8.

In FIG. 8, the left wheel 12 is seen to comprise standard components; namely, a rim 75L having a tire 76L thereon. Each tire has a plurality of spokes 77 all laid out in a conventional manner. A nut 42 is seen to be disposed upon the hub 40, which hub houses the left axle 14 therein, to retain the fork members thereon at their lower or free ends. Fork mounting in such fashion is deemed conventional in the bicycle art.

It is seen that I have disclosed a canted wheel carrier for use in rough terrain which can be easily move over logs, dirt, holes, and other items found in the woods or forest. With each axle canted, and the two wheels mounted normal to the axle as would be anticipated, but mounted with respect to each other, pitched, a straight course is easier to maintain, than is a standard wheelbarrow with a single upright wheel when moving through rough terrain.

The bed covering over the bed area of the frame may be formed of expanded metal mesh or expanded plastic mesh as may be desired. Each has its benefits and detriments. If a plastic bedding is used, it would be attached to suitable conventional means such as intermittent cable ties. The wheels while being depicted as balloon tires with spoked rims, could be solid rubber as well and the wheels could be mounted to a disk hub rather than to a spoked one. The frame has been depicted as being formed of members. Solid rods of suitable material may be employed as well as tubular members of suitable strength for one or all of the frame members. Thus for the purpose of this invention the word rod as used herein may also be considered to mean the word tube.

Since certain changes may be made in the described apparatus without departing from the scope of the invention herein involved, it is intended that all matter contained in the above description and shown in the accompanying drawings shall be interpreted as illustrative and not in a limiting sense.

I claim:

1. A wheeled carrier for use in rough terrain for carrying hunting kills, injured persons or supplies, which carrier has a frame, comprising left and right upper rods, and a nose rod, all of which are joined at one end, the front end of said carrier, and are spaced at the other ends thereof, a cross member disposed between the left and right upper rods near the spaced ends of each, and further including a bottom rod, which depends from said cross member and connects to said nose rod, to thereby define a bed area that is V-shaped;

two mirror image canted tired wheels, each of which is mounted on a separate axle disposed within a hub, and mounted within a respective fork, which fork in turn is attached to said frame below the bed area; and a bed is connected to the frame wherein the bed is formed of flexible mesh selected from the group consisting of expanded metal and expanded plastic.

2. In the carrier of claim 1 wherein the frame further includes a cross member disposed between the left and right upper rods near the spaced ends of each.

3. In the carrier of claim 1, further including a bottom rod, which depends from said cross member and connects to said nose rod.

4. In the carrier of claim 1 further including hand brakes comprising levers, one mounted on each of the left and right upper rods, and the caliper mechanisms thereof mounted to a respective fork.

5. In the carrier of claim 3 further including a tie down for attachment of a rope for freeing the carrier from mud or snow.

6. In the carrier of claim 1, further including hand brakes comprising levers, one mounted on each of the left and right upper rods, and the caliper mechanisms thereof mounted to a respective fork.

7. In the carrier of claim 1, wherein the wheels are bicycle spoked wheels with balloon tires thereon.

8. A wheeled carrier for use in rough terrain for carrying hunting kills, injured persons or supplies, which carrier has a frame, comprising left and right upper rods, and a nose rod, all of which are joined at one end, the front end of said carrier, and are spaced at the other ends thereof, a cross-member disposed between the left and right upper rods near the spaced ends of each, and further including a bottom rod, which depends from said cross member and connects to said nose rod, to thereby define a bed area that is V-shaped;

two mirror image canted balloon tired spoked wheels, each of which is mounted on a separate axle disposed within a hub, and mounted within a respective fork, which fork in turn is attached to said frame below the bed area; and a bed is connected to the frame, said bed being formed of a member selected from the group consisting of expanded metal and plastic, said carrier also including braking means installed on said carrier.

9. The carrier of claim 8 wherein the frame is specifically made of tubular members.

10. The carrier of claim 8, wherein the braking means comprises two mechanical brake sets each having a housing portion having a brake lever, cable holder, and a cable, said cable being connected to a caliper brake.

11. In the carrier of claim 8 further including a tie down for attachment of a rope for freeing the carrier from mud or snow and a pair of lever actuated caliper brakes.

\* \* \* \* \*